United States Patent
Sekii

(10) Patent No.: US 12,475,676 B2
(45) Date of Patent: Nov. 18, 2025

(54) OBJECT DETECTION METHOD, OBJECT DETECTION DEVICE, AND PROGRAM

(71) Applicant: Konica Minolta, Inc., Tokyo (JP)

(72) Inventor: Taiki Sekii, Tokyo (JP)

(73) Assignee: KONICA MINOLTA, INC., Tokyo (JP)

( * ) Notice: Subject to any disclaimer, the term of this patent is extended or adjusted under 35 U.S.C. 154(b) by 377 days.

(21) Appl. No.: 18/000,338

(22) PCT Filed: May 24, 2021

(86) PCT No.: PCT/JP2021/019555
§ 371 (c)(1),
(2) Date: Nov. 30, 2022

(87) PCT Pub. No.: WO2021/246217
PCT Pub. Date: Dec. 9, 2021

(65) Prior Publication Data
US 2024/0029394 A1    Jan. 25, 2024

(30) Foreign Application Priority Data
Jun. 5, 2020  (JP) .................................. 2020-098325

(51) Int. Cl.
*G06V 10/46*    (2022.01)
*G06T 7/66*    (2017.01)
(Continued)

(52) U.S. Cl.
CPC .............. *G06V 10/476* (2022.01); *G06T 7/66* (2017.01); *G06T 7/75* (2017.01); *G06V 10/764* (2022.01);
(Continued)

(58) Field of Classification Search
None
See application file for complete search history.

(56) References Cited

U.S. PATENT DOCUMENTS

| 11,348,269 B1 * | 5/2022 | Ebrahimi Afrouzi ... G01S 17/48 |
| 2012/0206438 A1 * | 8/2012 | Porikli ................. G06V 20/653 345/419 |

(Continued)

FOREIGN PATENT DOCUMENTS

| JP | 2006-202135 A | 8/2006 |
| JP | 2014-109555 A | 6/2014 |

OTHER PUBLICATIONS

Zhang et al., "Image retrieval using the extended salient region," Information Sciences 399 (2017) 154-182 (Year: 2017).*

(Continued)

*Primary Examiner* — Soo Shin
(74) *Attorney, Agent, or Firm* — LUCAS & MERCANTI, LLP

(57) ABSTRACT

An object detection method includes a key point estimation step of estimating key point candidates for each object in an image; and a detection step of detecting key points for each object based on the estimated key point candidates. Considering an object model that models shape of an object, the key points are points that satisfy a defined condition among points indicating a boundary of the object model that are projected onto defined coordinate axes. The defined coordinate axes have an origin at a geometric center of the object model and each forms a defined angle relative to a polar axis in a polar coordinate system set for the object model.

15 Claims, 16 Drawing Sheets

(51) Int. Cl.
*G06T 7/73* (2017.01)
*G06V 10/764* (2022.01)
*G06V 10/82* (2022.01)

(52) U.S. Cl.
CPC .... *G06V 10/82* (2022.01); *G06T 2207/20081* (2013.01); *G06T 2207/20084* (2013.01)

(56) References Cited

U.S. PATENT DOCUMENTS

| | | | | |
|---|---|---|---|---|
| 2021/0012106 A1* | 1/2021 | Markhasin | ............ | G06F 18/21 |
| 2021/0157998 A1* | 5/2021 | Rodriguez | ............ | G06V 20/20 |
| 2021/0201083 A1* | 7/2021 | Wang | ............ | G06V 20/56 |
| 2021/0295606 A1* | 9/2021 | Kim | ............ | G06T 17/20 |
| 2022/0148153 A1* | 5/2022 | Zhu | ............ | G06V 10/46 |
| 2022/0331841 A1* | 10/2022 | Filler | ............ | G06K 19/06037 |
| 2023/0351573 A1* | 11/2023 | Zhang | ............ | B63B 35/00 |
| 2025/0037492 A1* | 1/2025 | Skoryukina | ............ | G06V 30/418 |

OTHER PUBLICATIONS

Abdel-Kader et al., "A boundary-based approach to shape orientability using particle swarm optimization," SIViP (2014) 8:779-788 DOI 10.1007/s11760-013-0598-z (Year: 2014).*

Xingyi Zhou, Jiacheng Zhuo, Philipp Krahenbuhl, "Bottom-up Object Detection by Grouping Extreme and Center Points", Computer Vision and Pattern Recognition (CVPR) 2019; 10 pages.

Joseph Redmon, Santosh Divvala, Ross Girshick, Ali Farhadi, "You Only Look Once: Unified, Real-Time Object Detection", Computer Vision and Pattern Recognition (CVPR) 2016; 10 pages.

International Search Report and Written Opinion for the corresponding patent application No. PCT/JP2021/019555 dated Aug. 10, 2021, with English translation.

* cited by examiner

FIG. 9

| Background | Car | Car | Car | Car | Background | Background |
|---|---|---|---|---|---|---|
| Car | Car | Car | Car | Car | Background | Background |
| Car | Car | Car | Car | Car | Background | Background |
| Car | Car | Car | Car | Car | Background | Background |
| Car | Car | Car | Car | Background | Background | Background |
| Background | Person | Person | Person | Person | Person | Person |
| Background | Background | Person | Person | Person | Person | Person |
| Background | Background | Background | Background | Background | Background | Background |

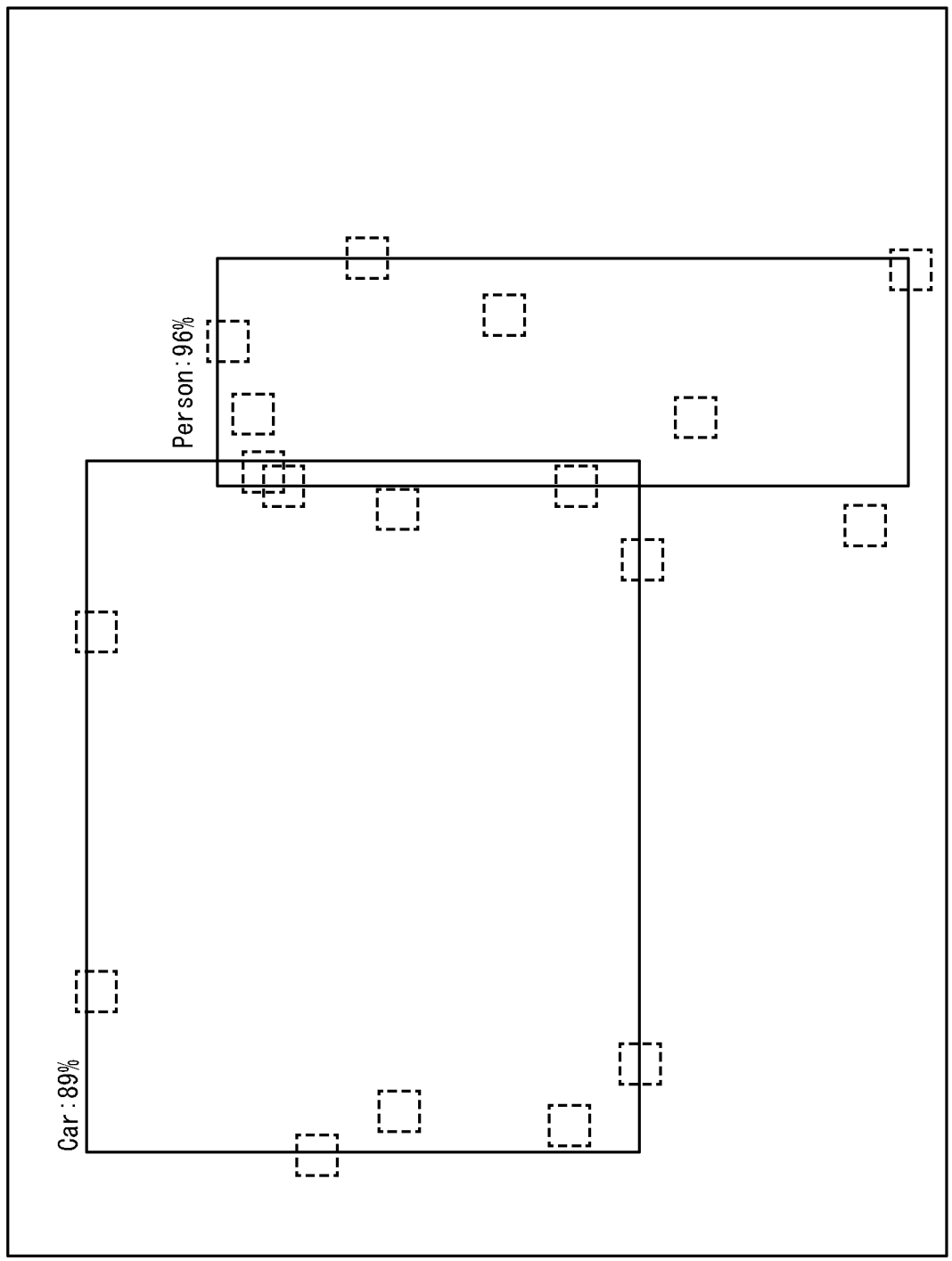

| Trained parameters 122 | |
|---|---|
| Neuron information | |
| Neuron numbers | Neuron weights |
| 1 | S1w1,⋯S1wi,⋯S1wn |
| 2 | S2w1,⋯S2wi,⋯S2wn |
| ⋮ | ⋮ |

→ Forward propagation

<-------- Back propagation

→ Forward propagation

OBJECT DETECTION METHOD, OBJECT DETECTION DEVICE, AND PROGRAM

CROSS REFERENCE TO RELATED APPLICATION

This Application is a 371 of PCT/JP2021/019555 filed on May 24, 2021, which, in turn, claims priority of Japanese Patent Application No. 2020-098325 filed on Jun. 5, 2020, and the above applications are incorporated herein by reference.

TECHNICAL FIELD

The present disclosure relates to an object detection method, an object detection device, and a program for detecting a defined object from an image.

BACKGROUND ART

Object detection technology, which detects objects such as people and vehicles from images captured by cameras, is used as a basic technology for applications such as surveillance camera systems and in-vehicle camera systems. In recent years, deep learning has been used as an object detection technique. Object detection methods based on deep learning include, for example, ExtremeNet (see Non-Patent Literature 1) and YOLO (see Non-Patent Literature 2).

According to Non-Patent Literature 1, four end points related to the boundary of an object in an image (a point with a minimum value on the X-axis, a point with a maximum value on the X-axis, a point with a minimum value on the Y-axis, and a point with a maximum value on the Y-axis) are detected using a trained neural network. By determining a rectangular area surrounding the object (Bounding Box: BB) using these four end points, accuracy of detecting a position of the object is improved.

According to Non-Patent Literature 2, fast object detection is achieved by evaluating an entire image only once and simultaneously executing "detection" to specify a position of an area containing an object in an image and "classification" to specify which detection target object class a detected object corresponds to, where a conventional neural network would do these steps separately.

CITATION LIST

Non-Patent Literature

[Non-Patent Literature 1] Xingyi Zhou, Jiacheng Zhuo, Philipp Krahenbuhl, "Bottom-up Object Detection by Grouping Extreme and Center Points", Computer Vision and Pattern Recognition (CVPR) 2019
[Non-Patent Literature 2] Joseph Redmon, Santosh Divvala, Ross Girshick, Ali Farhadi, "You Only Look Once: Unified, Real-Time Object Detection", Computer Vision and Pattern Recognition (CVPR) 2016

SUMMARY OF INVENTION

Technical Problem

However, according to Non-Patent Literature 1, detecting points on an image that are not the boundary of an object as key points is difficult. Further, Non-Patent Literature 2 describes detecting a position of an object as a bounding box, and does not describe detecting feature points on an image as key points.

The present disclosure is made in view of the above technical problems, and an object of the present disclosure is to provide an object detection method and an object detection device that can detect points that could not be detected by conventional methods as key points.

Solution to Problem

An object detection method according to an aspect of the present disclosure is for detecting each object in an image containing one or more objects of one or more defined categories, and comprises: a key point estimation step of estimating key point candidates for each object in the image; and a detection step of detecting key points for each object based on the estimated key point candidates, wherein considering an object model that models shape of an object, the key points are points that satisfy a defined condition among points indicating a boundary of the object model that are projected onto defined coordinate axes, and the defined coordinate axes have an origin at a geometric center of the object model and each forms a defined angle relative to a polar axis in a polar coordinate system set for the object model.

Further, according to at least one embodiment, among the points projected onto the defined coordinate axes that have a local maximum or local minimum value, the defined condition is satisfied by a point that has a maximum value and a point that has a minimum value in a positive range on each of the coordinate axes.

Further, according to at least one embodiment, the method further comprises a center position estimation step of estimating a center candidate for each object in the image and a confidence indicating likelihood of accurate estimation, wherein the detection step uses the confidence to detect a center position of each object from the center candidates, and uses each detected center position in detection of the key points of each object from the key point candidates.

Further, according to at least one embodiment, the key point estimation step estimates the key point candidates as small areas each having a size according to size of a corresponding object.

Further, according to at least one embodiment, the key point estimation step is executed by a machine-learning model trained to detect each object.

Further, according to at least one embodiment, the key point estimation step and the center position estimation step are executed by a machine-learning model trained to detect each object.

Further, according to at least one embodiment, the machine-learning model is a convolutional neural network, and parameters of the convolutional neural network are defined by machine-learning based on a training image including a detection target object, a true value of a center position of the detection target object in the training image, and a true value of a key point of the detection target object in the training image.

An object detection device according to an aspect of the present disclosure is detecting each object in an image containing one or more objects of one or more defined categories, and comprises: a machine-learning model trained to detect each object, which executes a key point estimation process of estimating key point candidates for each object in the image; and a detection unit that detects key points for each object based on the estimated key point candidates, wherein considering an object model that models shape of an object, the key points are points that satisfy a defined condition among points indicative of a boundary of the object model that are projected onto a defined coordinate axis, and the defined coordinate axes have an origin at a geometric center of the object model and each forms a defined angle relative to a polar axis in a polar coordinate system set for the object model.

A program according to an aspect of the present disclosure causes a computer to execute object detection processing for detecting each object in an image containing one or more objects of one or more defined categories, wherein the object detection processing comprises: a key point estimation step of estimating key point candidates for each object in the image; and a detection step of detecting key points for each object based on the estimated key point candidates, wherein considering an object model that models shape of an object, the key points are points that satisfy a defined condition among points indicative of a boundary of the object model that are projected onto a defined coordinate axis, and the defined coordinate axes have an origin at a geometric center of the object model and each forms a defined angle relative to a polar axis in a polar coordinate system set for the object model.

Advantageous Effects of Invention

According to the present disclosure, points satisfying defined conditions in a polar coordinate system set for an object model that models an object shape are detected as key points, and therefore it is possible to detect feature points that are different from key points satisfying conditions in an orthogonal coordinate system of an input image.

BRIEF DESCRIPTION OF DRAWINGS

FIG. 9 is a diagram illustrating an example of classification results of class classification performed for each grid cell.

FIG. 11 is a diagram schematically illustrating object detection results.

DESCRIPTION OF EMBODIMENTS

1. Embodiment 1

The following is a description of an object detection device 100 according to Embodiment 1.

1.1. Structure

Figure 1:
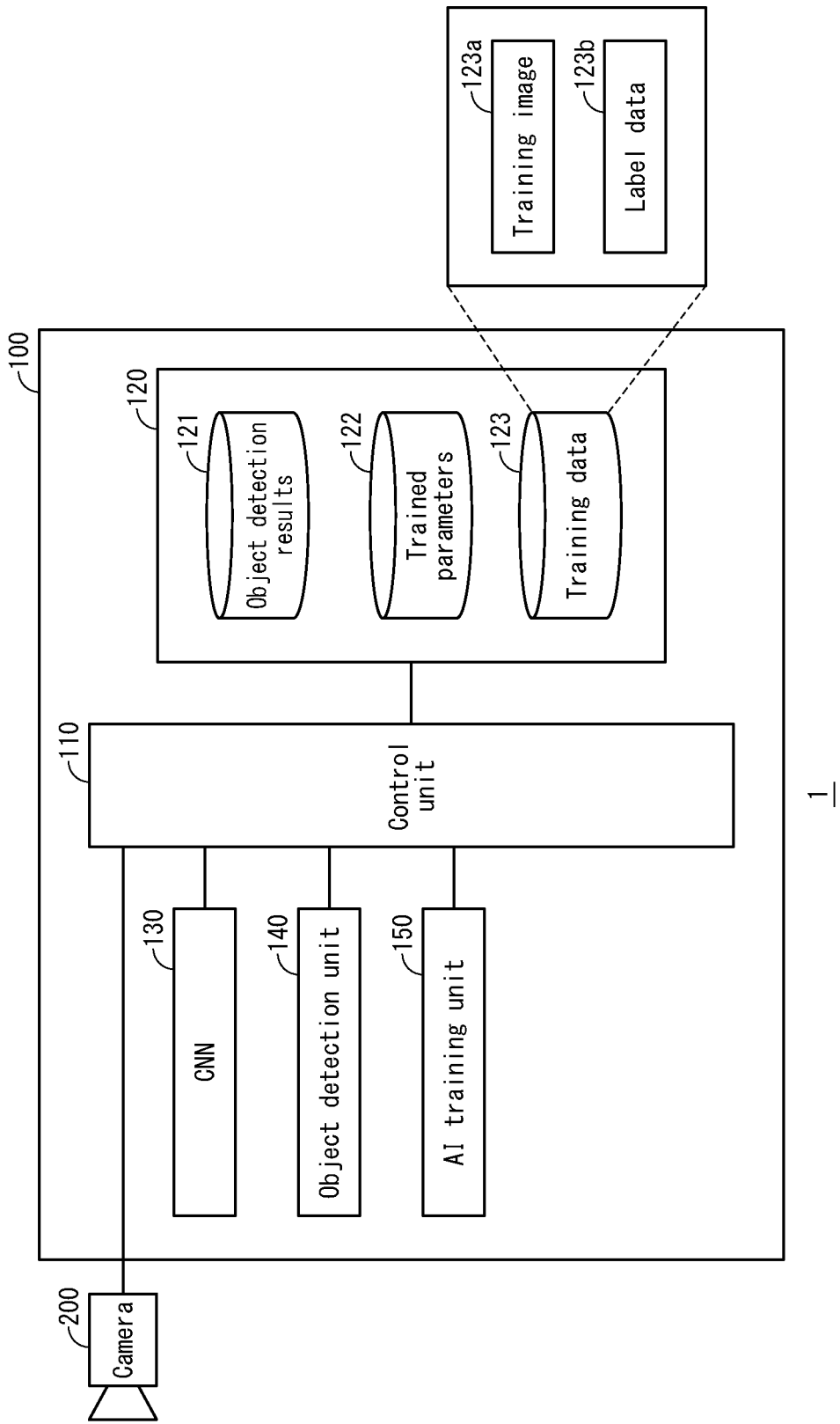
FIG. 1 is a block diagram illustrating a schematic structure of object detection device 100 according to Embodiment 1.

FIG. 1 is a block diagram illustrating structure of the object detection device 100. As illustrated, the object detection device 100 includes a camera 200, a control unit 110, a non-volatile storage unit 120, a convolutional neural network (CNN) 130, an object detection unit 140, and an artificial intelligence (AI) training unit 150.

The camera 200 includes an imaging element such as a complementary metal-oxide-semiconductor field-effect transistor (CMOS) image sensor or charge-coupled device (CCD) image sensor, and converts light imaged on the imaging element into an electric signal by photoelectric conversion to output an image of a defined size. If size of an output image of the camera 200 and size of an input image of the CNN 130 are different, a structure for resizing the output image of the camera 200 may be provided.

The control unit 110 includes a central processing unit (CPU), read-only memory (ROM), random access memory (RAM), and the like. The RAM is loaded with a computer program and data stored in the ROM and the storage unit 120, and the CPU operates according to the computer program and the data on the RAM, thereby realizing each processing unit (the CNN 130, the object detection unit 140, and the AI training unit 150).

The storage unit 120 is, for example, configured as a hard disk. The storage unit 120 may be configured as a non-volatile semiconductor memory. The storage unit 120 stores object detection results 121, trained parameters 122, and training data 123. The training data 123 includes training images 123a and label data 123b.

The CNN 130 is a machine-leaning convolutional neural network for object detection. The CNN 130 outputs object estimation data by evaluating an entire image once from an input image of a defined size. The object estimation data includes data such as a BB surrounding a detection target object in the input image (OB), a BB including a key point of the detection target object in the input image (PB), and class probability indicating which detection target object class the object surrounded by the OB corresponds to.

The object detection unit 140 removes OBs with confidence scores lower than a threshold value and OBs that overlap with OBs having higher confidence scores from the object estimation data output from the CNN 130. Similarly, a duplicate BB removal unit removes PBs having confidence scores lower than a threshold value and PBs that overlap with PBs having higher confidence scores. Confidence scores are calculated using confidence and class probability of OBs and PBs included in the object estimation data. Further, the object detection unit 140 associates OBs and PBs that remain, and stores associated OBs and PBs in the storage unit 120 as the object detection results 121.

The AI training unit 150 performs CNN training using the training data 123 stored in the storage unit 120, and stores training results in the storage unit 120 as the trained parameters 122. Position and size of an object BB after shaping and a class determination value based on class probability of the object BB are stored as a detection result.

1.2. CNN 130

Figure 14:
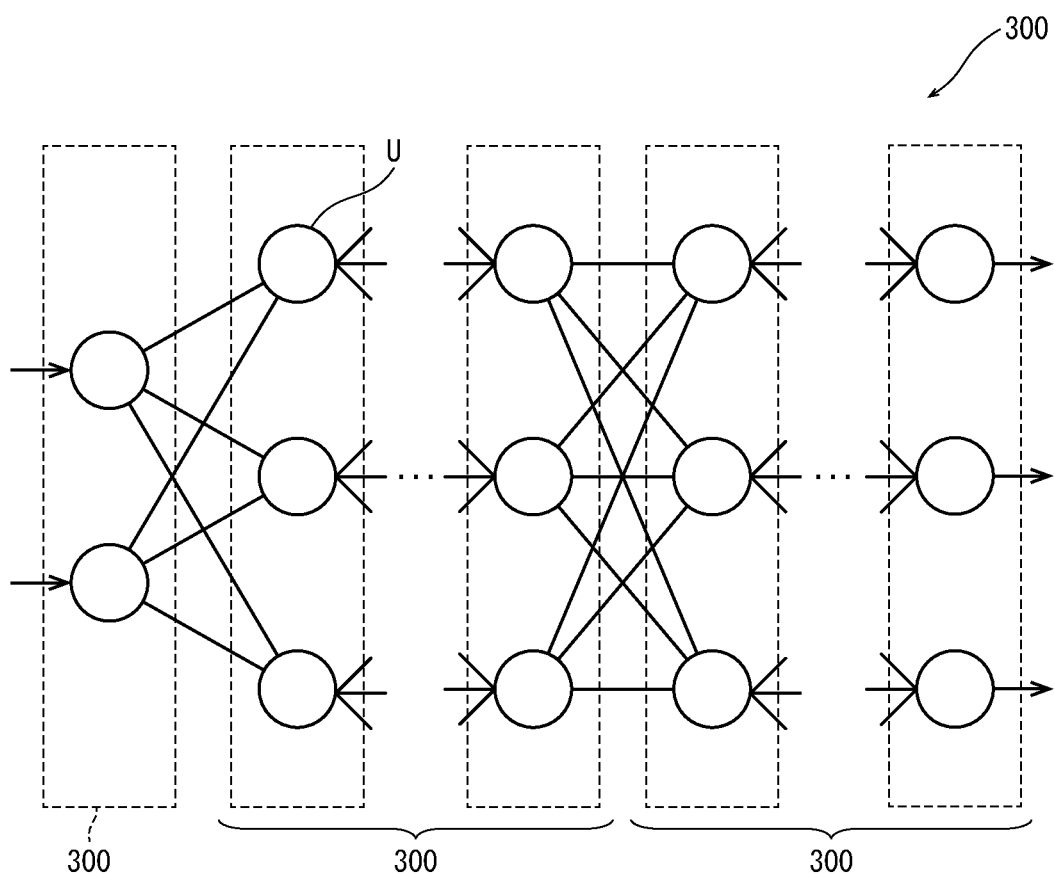
FIG. 14 is a block diagram illustrating structure of CNN 130.

A neural network 300 illustrated in FIG. 14 is described as an example of a convolutional neural network.
(1) Structure of Neural Network 300

The neural network 300, as illustrated, is a hierarchical neural network that has an input layer 300a, a feature extraction layer 300b, and an output layer 300c.

Here, a neural network is an information processing system that imitates a human neural network. In the neural network 300, an engineered neuron model corresponding to a nerve cell is here called a neuron U. The input layer 300a, the feature extraction layer 300b, and the output layer 300c are configured to each have a plurality of neurons U.

The input layer 300a is typically one layer. Neurons U of the input layer 300a receive, for example, pixel values of pixels forming an image. Received image values are output as-is from the neurons U of the input layer 300a to the feature extraction layer 300b. The feature extraction layer 300b extract features from data received from the input layer 300a and outputs to the output layer 300c. The output layer 300c performs object detection using features extracted by the feature extraction layer 300b.

Figures 15A, 15B:
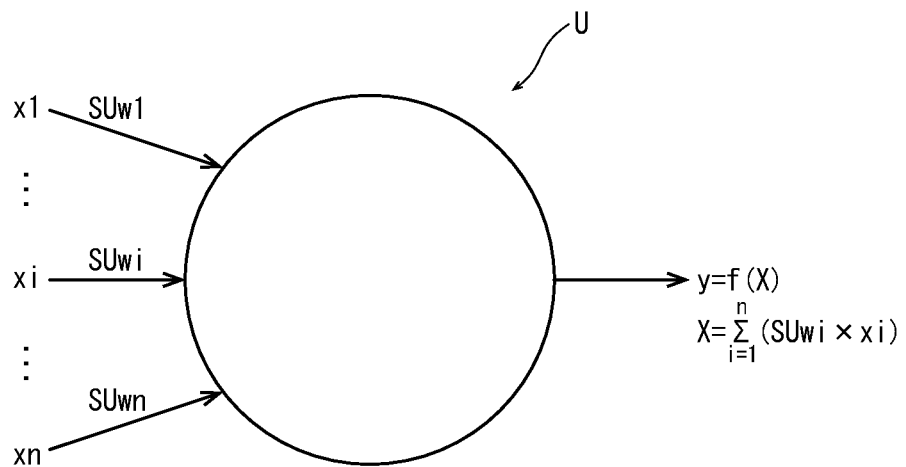
FIG. 15A is a schematic diagram illustrating one neuron U of CNN 130.
FIG. 15B is a diagram illustrating data structure of CNN 130 trained parameters.

As a neuron U, an element with multiple inputs and one output is normally used, as illustrated in FIG. 15A. Signals propagate in only one direction, and input signals $xi(i=1, 2, \ldots n)$ are multiplied by neuron weights (SUwi) on input to a neuron U. Neuron weights can be changed through training. The neuron U outputs a sum of the input values (SUwi×xi) each multiplied by neuron weights SUwi after transformation by an activation function f(X). That is, an output value of a neuron U is represented by the following expression.

$$y=f(X)$$

Here, $$X=\Sigma(SUwi \times xi)$$

Note that, as the activation function, for example, a ReLU or a sigmoid function can be used.

As a training method for the neural network 300, for example, an error is calculated using a defined error function from a value indicating a correct answer (training data) and an output value of the CNN 300 (object estimation data), and in order to minimize the error, back propagation is used in which neuron weights of the feature extraction layer 300b and neuron weights of the output layer 300c are sequentially changed using a steepest descent method or the like.
(2) Training Process The following describes a training process of the neural network 300.

The training process is a process of advance training of the neural network 300. In the training process, advance training of the neural network 300 is performed using the training data 123 obtained in advance.

Figure 16A:
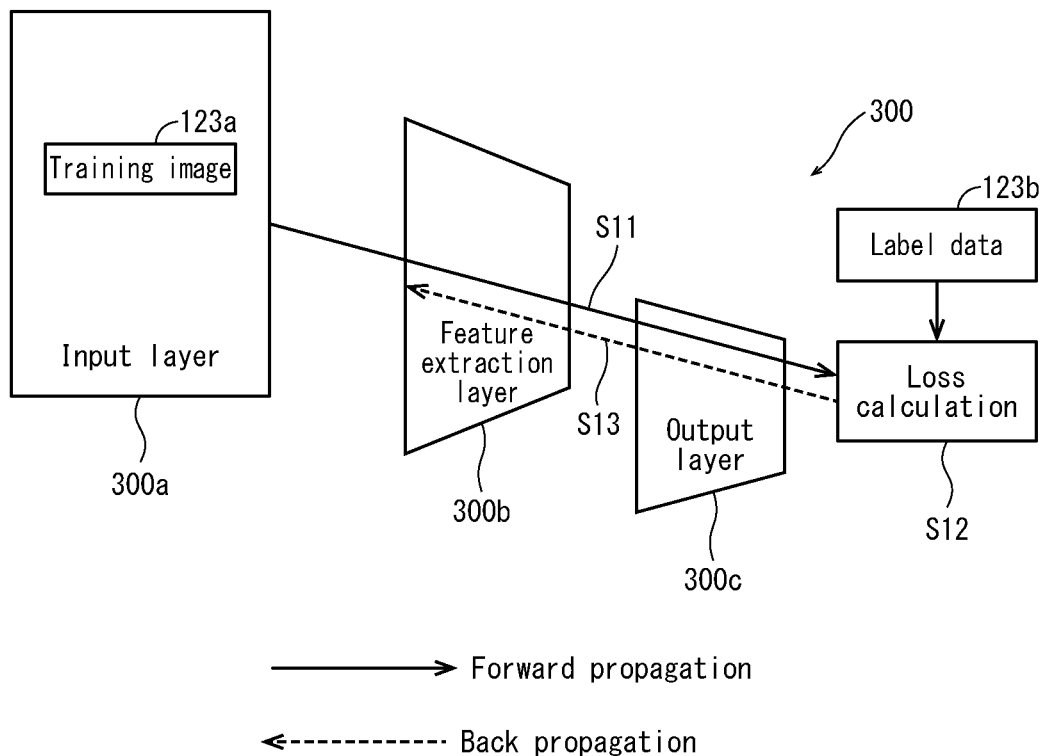
FIG. 16A is a diagram schematically illustrating data propagation during training.

FIG. 16A schematically illustrates a data propagation model of the training process.

The training images 123a are input to the input layer 300a of the neural network 300 image by image, and output from the input layer 300a to the feature extraction layer 300b. Each neuron of the feature extraction layer 300b performs an operation applying neuron weight to the input data, and outputs data indicating an extracted feature to the output layer 300c. Each neuron U of the output layer 300c performs an operation applying neuron weight to the input data (step S11). This provides object estimation based on the above features. Data indicating results of object estimation is output from the output layer 300c.

An output value of the output layer 300c (object estimation data) is compared to the label data 123b, and an error (loss) is calculated using a defined error function (step S12). In order to reduce this error, neuron weights and the like of the output layer 300c and neuron weights and the like of the feature extraction layer 300b are sequentially changed (back propagation) (step S13). In this way, training of the CNN 300 is performed.
(3) Training Results Training results are stored in the storage unit 120 as the trained parameters 122. The trained parameters 122 are composed of neuron information 122-1, as illustrated in FIG. 15B. Each entry of the neuron information 122-1 corresponds to one of the neurons U of the feature extraction layer 300b or the output layer 300c.

Each entry of the neuron information 122-1 includes a neuron number 122-2 and a neuron weight 122-3.

Each of the neuron numbers 122-2 is a number that identifies a neuron U of the feature extraction layer 300b or the output layer 300c.

Each of the neuron weights 122-3 is a neuron weight of a neuron U of the feature extraction layer 300b or the output layer 300c.
(4) Estimation Process The following describes an estimation process of the neural network 300.

Figure 16B:
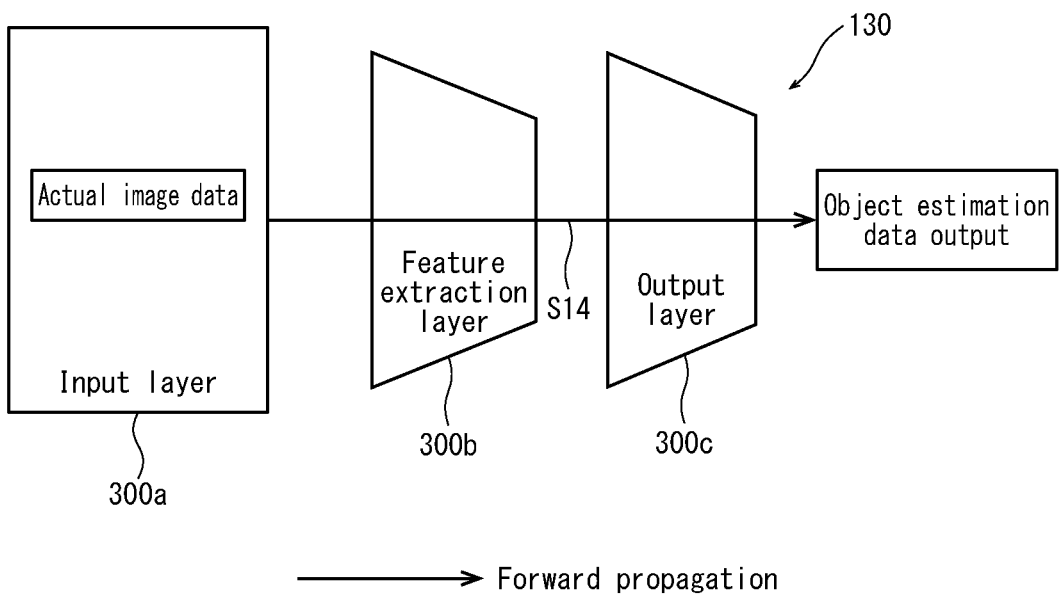
FIG. 16B is a diagram schematically illustrating data propagation during estimation.

FIG. 16B illustrates a data propagation model when estimating an object using the neural network 300 trained by the training process described above and using image data obtained by the camera 200 as input.

In the estimation process of the neural network 300, feature extraction and object estimation are executed using the feature extraction layer 300b and the output layer 300c that have been trained (step S14).
(5) CNN 130

The CNN 130 according to the embodiment has the same configuration as the neural network 300 and executes training and estimation in the same way as the neural network 300.

The CNN 130 outputs object estimation data for each W×H grid cell into which the input image is divided.

Figure 3:
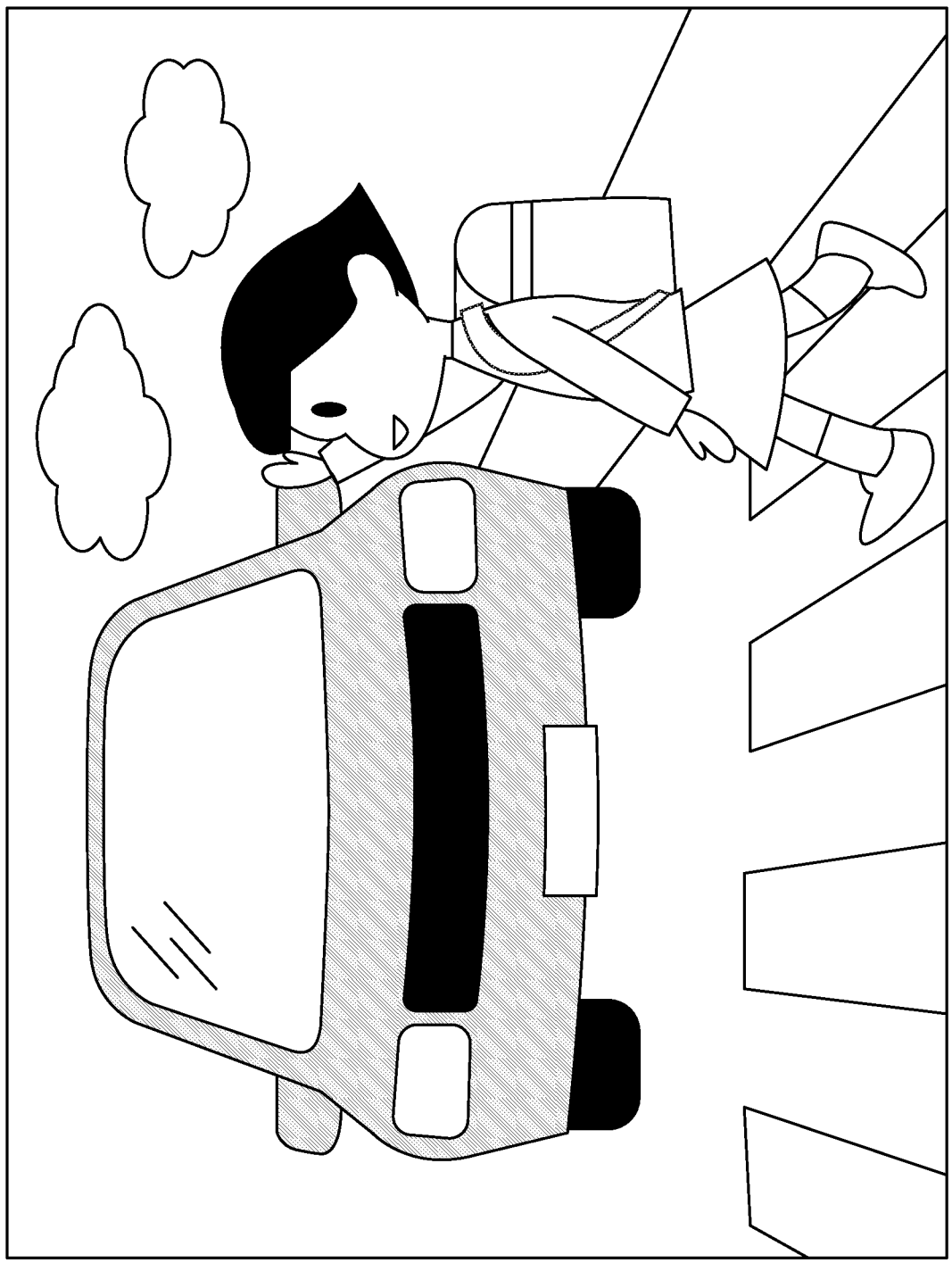
FIG. 3 is a diagram illustrating an example of an image captured by camera 200 that is input to CNN 130.
Figure 4:
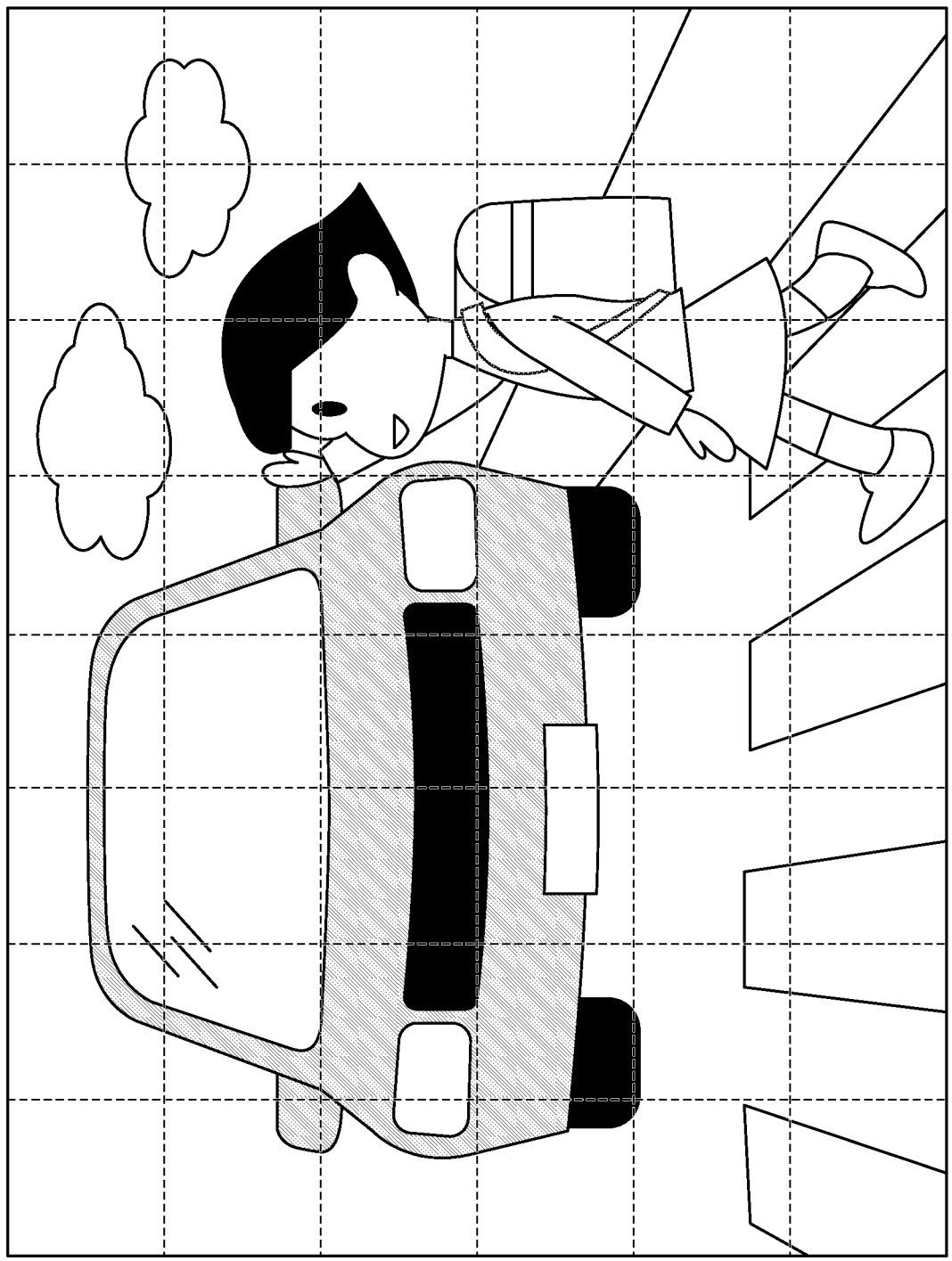
FIG. 4 is a diagram illustrating a captured image divided into W×H grid cells.

FIG. 3 is an example of an input image for the CNN 130, and FIG. 4 is the input image divided into grid cells. In the example of FIG. 4, the input image is divided into 8×6 grid cells.

Figures 5A, 5B:
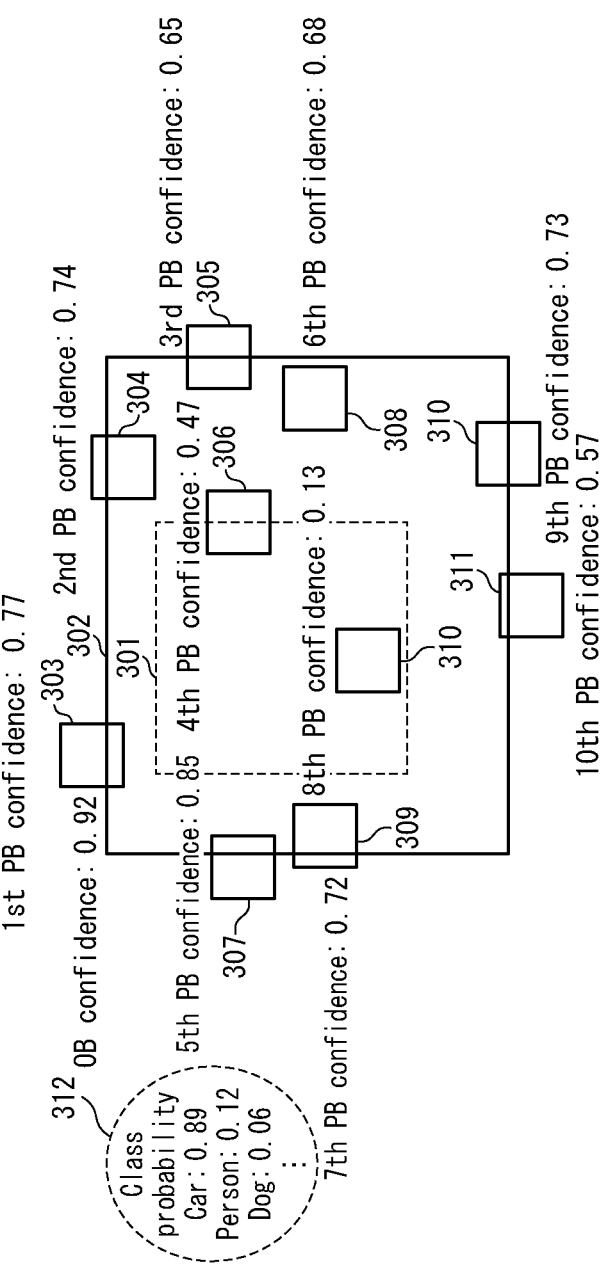
FIG. 5A is a diagram illustrating data structure of object estimation data output from CNN 130.
FIG. 5B is a diagram illustrating information represented by object estimation data.

FIG. 5A illustrates a data structure of object estimation data for each grid cell. As illustrated in FIG. 5A, object estimation data 400 consists of OB information, 1st PB information, 2nd PB information, . . . , 2·Nth PB information, and class probabilities.

The OB information consists of position relative to grid cell (X axis and Y axis), size (X axis and Y axis), and confidence. Position relative to grid cell is information indicating an estimated position of the OB and indicates the upper left coordinates of the OB when the origin is the upper left coordinates of a corresponding grid cell. Size is information indicating size of the OB and indicates the lower right coordinates of the OB when the origin is the upper left coordinates of the OB. Confidence is information indicating whether an object corresponding to any detection target object class exists in the OB, and if so, whether the object's position and size can be detected accurately. Confidence is a value close to 1 when it is estimated that an object corresponding to a detection target object class exists in the OB, and a value close to 0 when it is estimated that such an object does not exist in the OB. Further, confidence is a value close to 1 when it is estimated that position and size have been detected accurately, and a value close to 0 when it is estimated that position and size have not been detected accurately.

Similarly, the 1st PB information, the 2nd PB information, . . . , the 2·Nth PB information each consist of position relative to grid cell (X axis and Y axis), size (X axis and Y axis), and confidence.

Class probability is information indicating an estimated value indicating which detection target object class the object included in the object BB of the corresponding grid cell corresponds to. For example, if the number of object classes is C, and object classes are class 1 (person), class 2 (car), etc., then when it is estimated that a person is included in the object BB, the probability of person (class 1) is high (a value close to 1), and when it is estimated that a car is included in the object BB, the probability of car (class 2) is high (a value close to 1).

In this way, the CNN 130 outputs, with respect to each grid cell, five-dimensional BB information (OB information, 1st PB information, . . . , 2·Nth PB information) and C-dimensional class probability (5×(1+2N)+C) object estimation data. This is calculated for each W×H grid cell, and therefore the object estimation data output by the trained AI model 20 is W×H×(5×(1+2N)+C) dimensional data.

FIG. 5B is an example visually illustrating object data for grid cell 301, taken from object estimation data output for an input image. Here, when N=5, a total of 10 PBs from the 1st PB to the 10th PB are output. Reference sign 302 is indicates an estimated OB for the grid cell 301 and reference signs 302-311 indicate the 10 PBs estimated for the grid cell 301. Reference sign 312 indicates class probabilities of the object included in the OB 302.

(6) Definition of Key Points Estimated by CNN 130

As mentioned above, a PB is a BB estimated to include a key point. The following is a description of key points included in the PBs (1st PB to 2·Nth PB) included in the object estimation data output by the CNN 130.

An object model is considered that three-dimensionally models an object of a detection target object class. Here, a case is described where the detection target object class is a car.

Figure 6:
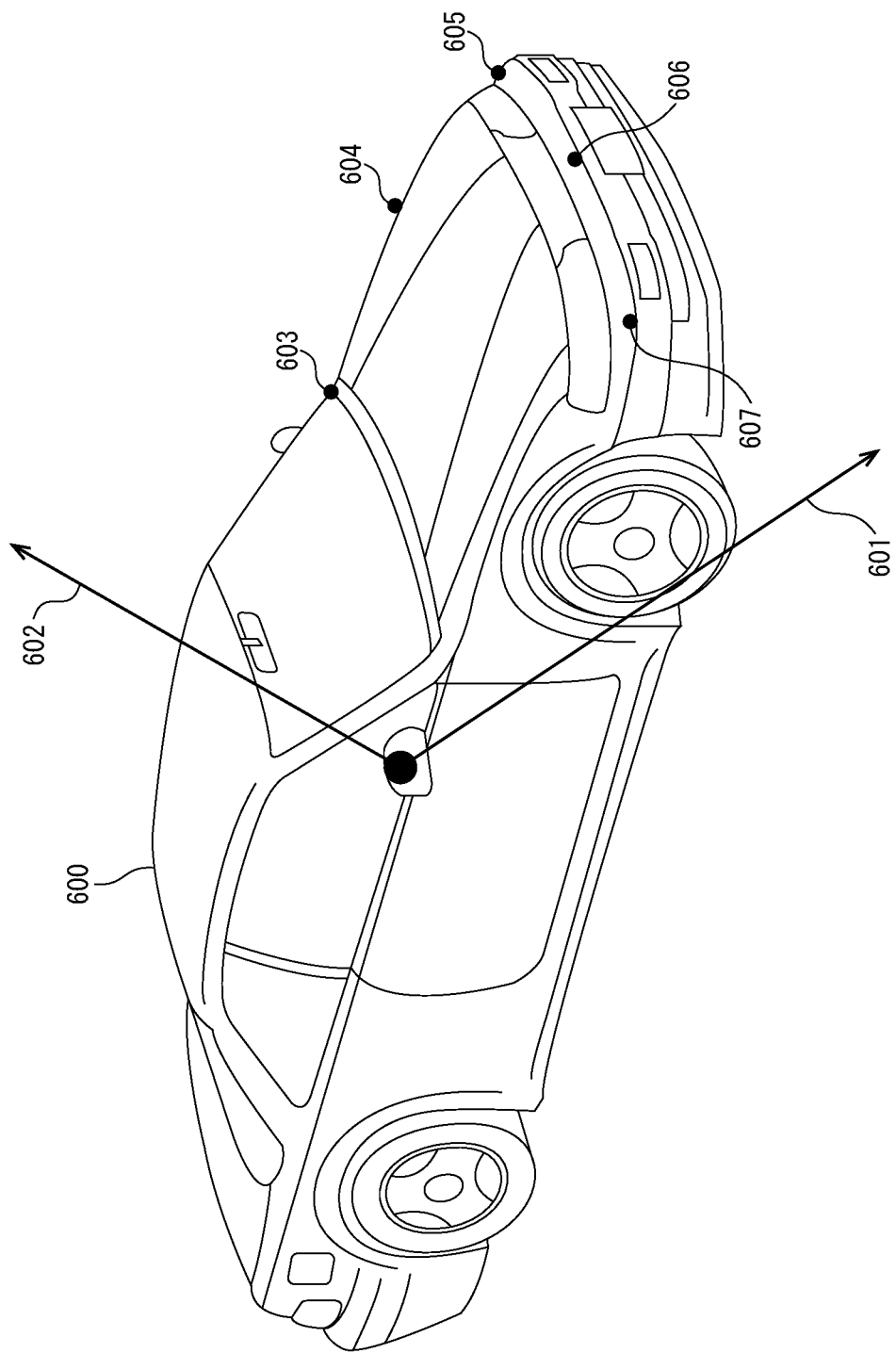
FIG. 6 is a schematic diagram illustrating an object model and coordinate axes set for the object model.

FIG. 6 is diagram illustrating an object model 600 of a car, which is a detection target object class, and coordinate axes 601, 602 set for the object model 600. Here, the origin of the coordinate axes 601, 602 is a geometric center of the object model 600. The coordinate axes 601, 602 each form a defined angle relative to a polar axis in a polar coordinate system with the center of the object model as the origin.

Points obtained by projecting points 603-607 on the object model 600 onto the coordinate axes 601, 602 are considered.

Figure 7:
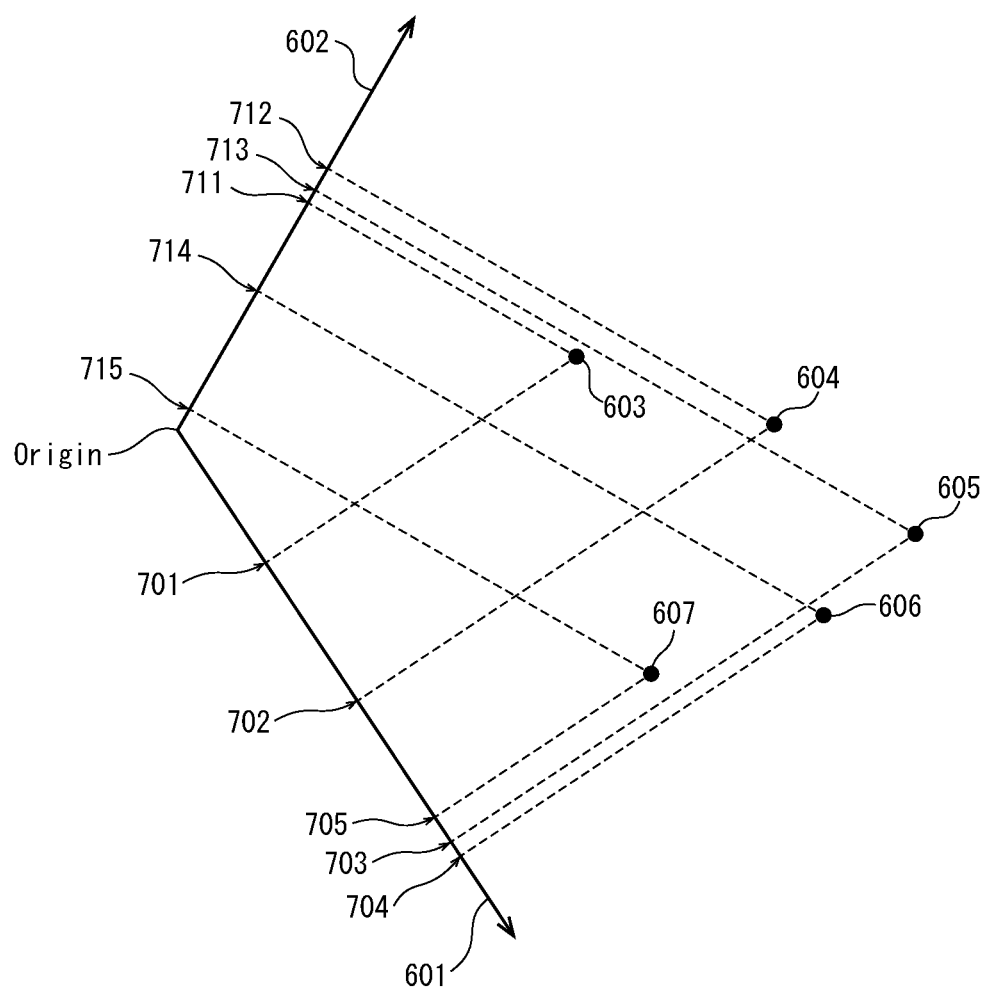
FIG. 7 is a diagram illustrating projection of points in an object model onto coordinate axes.

FIG. 7 is a diagram illustrating points obtained by projecting points on the object model 600 onto the coordinate axes 601, 602.

As illustrated in FIG. 7, the points 603-607 on the object model 600 are projected onto points 701-705 on the coordinate axis 601. Similarly, the points 603-607 are projected onto points 711-715 on the coordinate axis 602.

For each point on a surface of the object model 600, if the angles relative to the polar coordinate system formed by the coordinate axes 601, 602 are appropriately selected, a point that indicates a feature, such as a point that protrudes from other portions or a point that is recessed from other portions, is a point of local maximum or local minimum value among points projected onto the coordinate axes 601, 602. Conversely, of the points projected onto the coordinate axes 601, 602, points that are local maximum or local minimum values can be said to be points that indicate features among the points on the surface of the object model 600. In the present embodiment, among the points obtained by projecting each point on the surface of the object model 600 onto the coordinate axes, points having local maximum and minimum values are obtained, and a point having a maximum value and a point having a minimum value in a positive range are defined as key points. Further, by setting N angles and defining two key points for each of the N coordinate axes, a total of 2N key points are defined.

In this way, among points on the surface of the object model 600, 2N points that protrude from other portions or are recessed from other portions are defined as key points.

(7) Training Data

The following describes training data for estimating key points defined as above.

Figure 8:
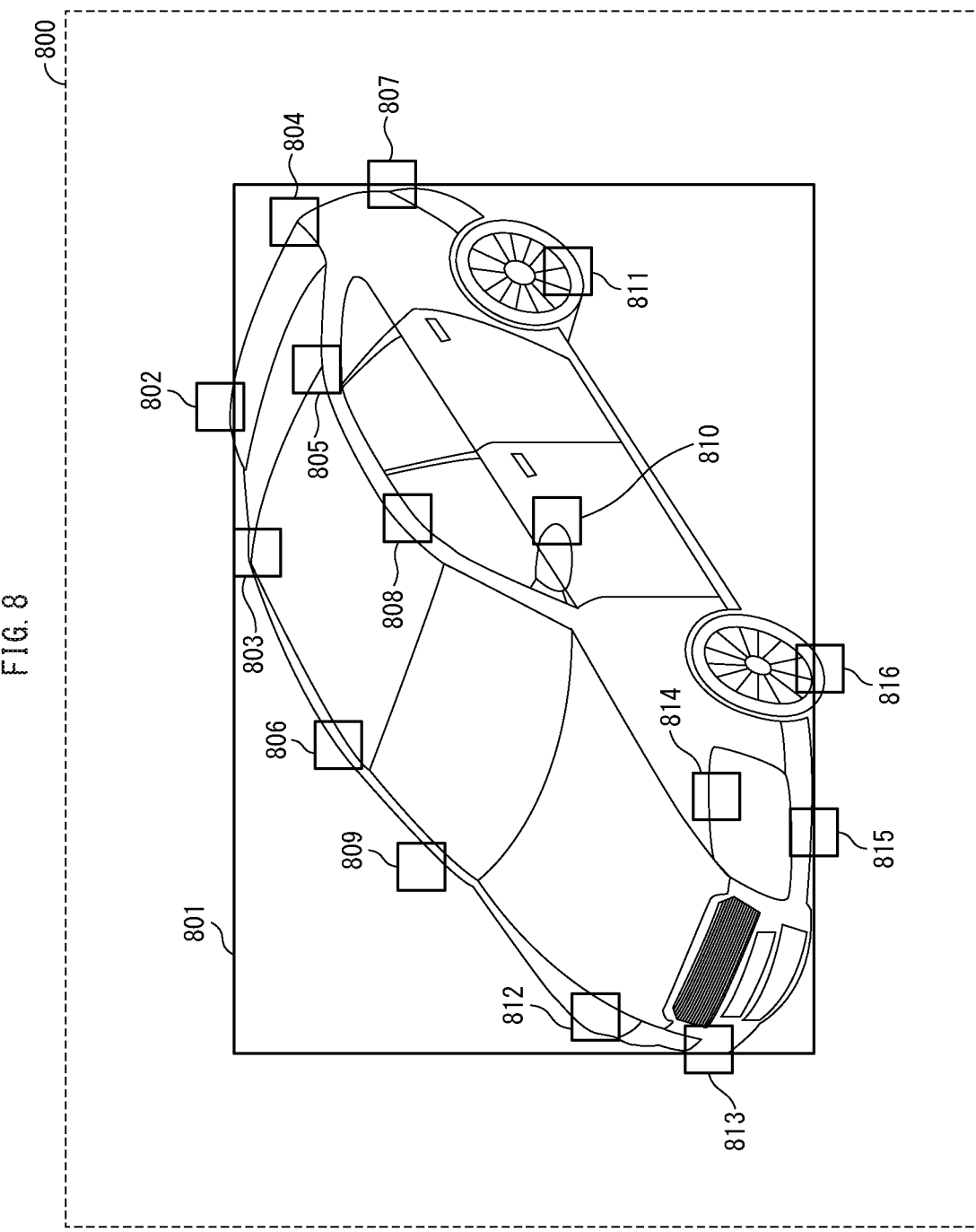
FIG. 8 is a diagram illustrating an example of training data.

FIG. 8 is a diagram schematically illustrating training data for estimating key points defined as above. An image 800 is a training image and includes an object corresponding to a detection target object class. Reference signs 801-816 indicate training data, and the reference sign 801 indicates true values of position and size of a BB (OBT) containing an object of the detection target object class included in the training image 800. Further, reference signs 802-816 indicate true values of position and size of BBs (PBTs) containing key points of the object included in the OBT 801. Here, a center position of each PBT is set according to the definition of a key point as described above. Size of each PBT may be a constant multiple of a minimum distance between each key point.

Further, training data also includes true values of class probability ("one-hot class probability") indicating the object class of the object included in the OBT.

(8) Error Function

The following describes an error function for estimating key points defined as above. When training, first, object estimation data is output in the same way when estimating. Output estimation data is then compared to training data, and an error is calculated based on the error function.

Five errors are calculated in the error function. The first error is an error between positions of the OB and PBs of the object estimation data and positions of the OBT and PBTs of the label data in a grid cell where the center of the OBT of the training data exists. The second error is an error between sizes of the OB and PBs of the object estimation data and sizes of the OBT and PBTs of the label data in the grid cell where the center of the OBT of the training data exists. The third error is an error between confidence of the OB and PBs of the object estimation data and confidence of the OBT and PBTs of the label data in the grid cell where the center of the OBT of the training data exists. The fourth error is an error between confidence of the OB and PBs of the object estimation data and not-object-confidence in grid cells where the center of the OBT of the label data does not exist.

The fifth error is an error between class probability of the object estimation data and class probability of the label data in the grid cell where the center of the OBT of the training data exists. Confidence of the OBT and PBTs of training data may be calculated as 1, and not-object confidence may be calculated as 0.

1.3. Object Detection Unit 140

The following describes processing executed by the object detection unit 140.

The object detection unit 140 classifies each grid cell based on object estimation data output from the CNN 130. The object detection unit 140 calculates confidence for each grid cell, and determines that a grid cell with a confidence equal to or lower than a defined threshold (for example, 0.6) is a background grid cell that does not contain an object. The object detection unit 140 determines that grid cells other than background grid cells are grid cells of the object class having the highest class probability. FIG. 9 is an example of classification results of classification executed for each grid cell.

Confidence score is, for example, a product of class probability of the most probable object class and confidence of the object BB. Confidence of the object BB may be used directly as the confidence score, or class probability of the object class with the highest probability may be used as the confidence score.

The object detection unit 140 removes the OB and each PB of grid cells determined to be background.

The object detection unit 140 removes OBs that have a high degree of overlap with OBs of grid cells that have a higher confidence score for each type of object class that has been determined to be an object class other than background. Specifically, for one object class, a degree of overlap between the OB of the grid cell having the highest confidence score and the OB of other grid cells is calculated, and the OBs of the other grid cells are removed if the calculated degree of overlap is equal to or greater than a defined threshold (for example, 0.6). Subsequently, processing is repeated such that a degree of overlap between the OB of the grid cell having the highest confidence score among OBs that have not been removed and the OBs of other grid cells is calculated, and if the degree of overlap is high, the OBs of the other grid cells are removed.

By removing OBs that overlap with OBs having higher confidence scores in this way, even if multiple OBs are detected for the same object, the object can be detected as one object.

As the degree of overlap, Intersection-over-Union (IoU) can be used, for example. IoU enables calculation when an area 1 overlaps with an area 2, such that when A is an area of part of area 1 that is not common with area 2, B is an area of part of area 2 that is not common with area 1, and C is a common area of area 1 and area 2, $IoU=C/(A+B+C)$.

As with OBs, the object detection unit 140 also removes 1st PBs having a high degree of overlap with a 1st PB of a grid cell having a higher confidence score. The same is also true for the 2nd PBs, . . . 2·Nth PBs.

Figure 10A:
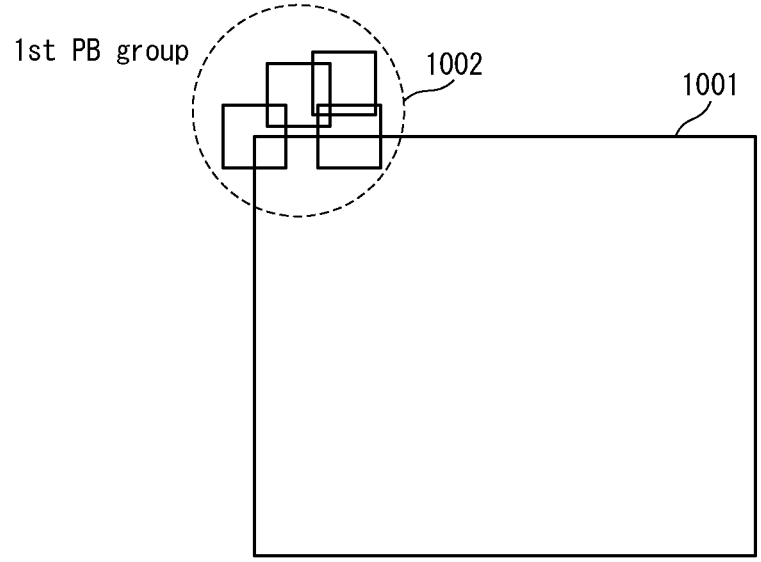
FIG. 10A illustrates an example of remaining OB and 1st PB after BB removal processing.

FIG. 10A illustrates an example of a remaining OB and 1st PBs after removing OBs and PBs of grid cells determined to be background, and removing OBs and PBs that have a high overlap with a grid cell having a higher reliability score. In the example of FIG. 10A, with respect to an OB 1001, a 1st PB group 1002 consisting of four 1st PBs remains without yet being removed.

Figure 10B:
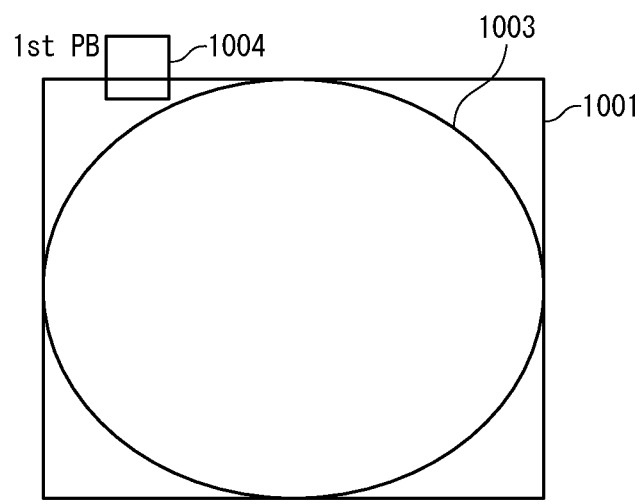
FIG. 10B is a diagram illustrating an example of 1st PB associated with OB.

The object detection unit 140 associates the OB 1001 with one 1st PB in the 1st PB group 1002. Specifically, as illustrated in FIG. 10B, the object detection unit 140 considers an ellipse 1003 inside the OB 1001 and associates the 1st PB 1004, which is located closest to the ellipse 1003 from the 1st PB group 1002, with the OB 1001.

Figure 10C:
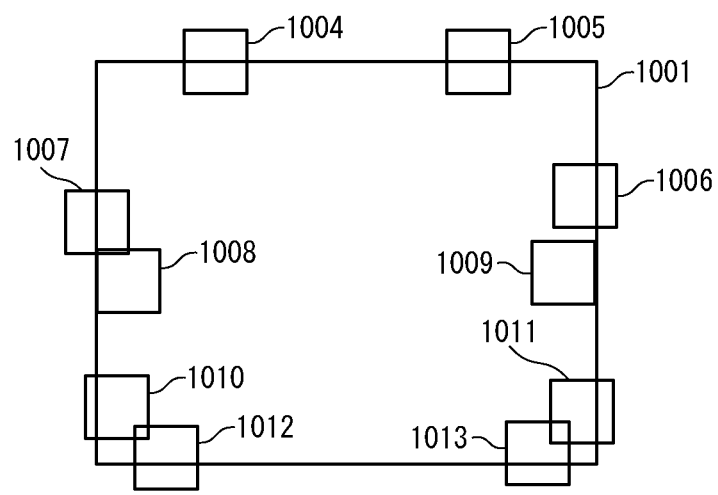
FIG. 10C is a diagram illustrating an example of each PB associated with OB.

Similarly, association with the OB 1001 is executed for each of the 2nd PBs, . . . , 2·Nth PBs. FIG. 10C illustrates a result of associating ten PBs, the PB 1004 to PB 1013, with the OB 1001.

Here, the distance between each BB and the ellipse is the distance from the center of the BB to a nearest point on the ellipse.

The object detection unit 140 stores in the storage unit 120 the position and size of the remaining OB, positions and sizes of PBs associated with the OB, and classification results of corresponding grid cells as an object detection result 121.

FIG. 11 illustrates an example of the object detection result 121 consisting of position and size of OBs, position and size of associated PBs, and classification results.

Figure 12:
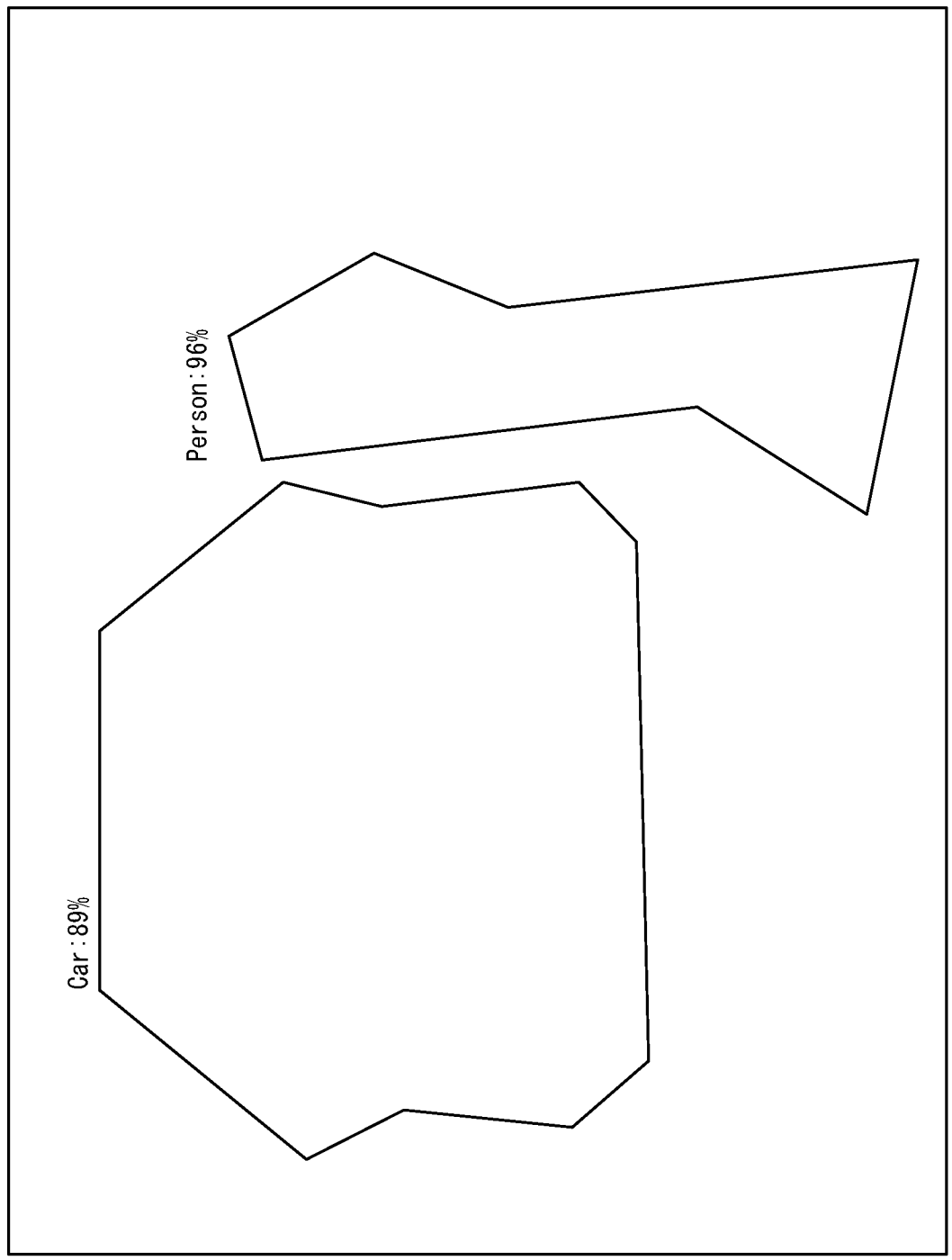
FIG. 12 is a diagram illustrating outlines of detected objects.

FIG. 12 illustrates an example of OB outlines obtained by connecting PB centers in the object detection result 121 in a defined order. The PB centers each indicate a key point of an object, and therefore an area enclosed by line segments connecting the PB centers indicates an outline of a detected object. Increasing the number of defined PBs makes it possible to increase accuracy of an outline of a displayed object. An order of connection of PBs may be a clockwise direction from the center of the OB.

Figure 13:
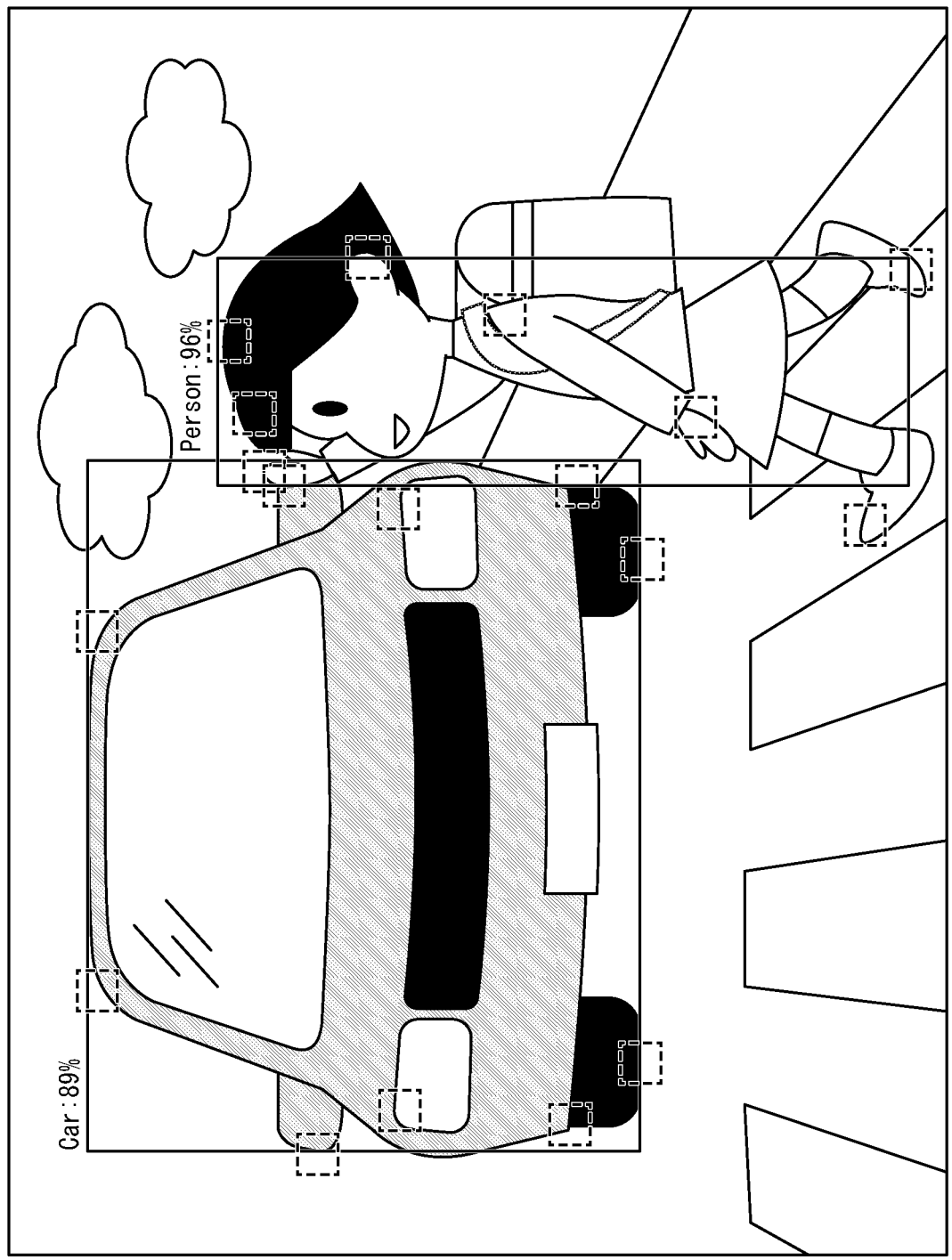
FIG. 13 is a diagram in which object detection results are superimposed on an input image.

FIG. 13 illustrates an example of the object detection result 121 consisting of position and size of OBs, position and size of associated PBs, and classification results, overlaid on the input image. As illustrated, in each object, points protruding or recessed from other portions are detected as key points.

1.4. Operation

Figure 2:
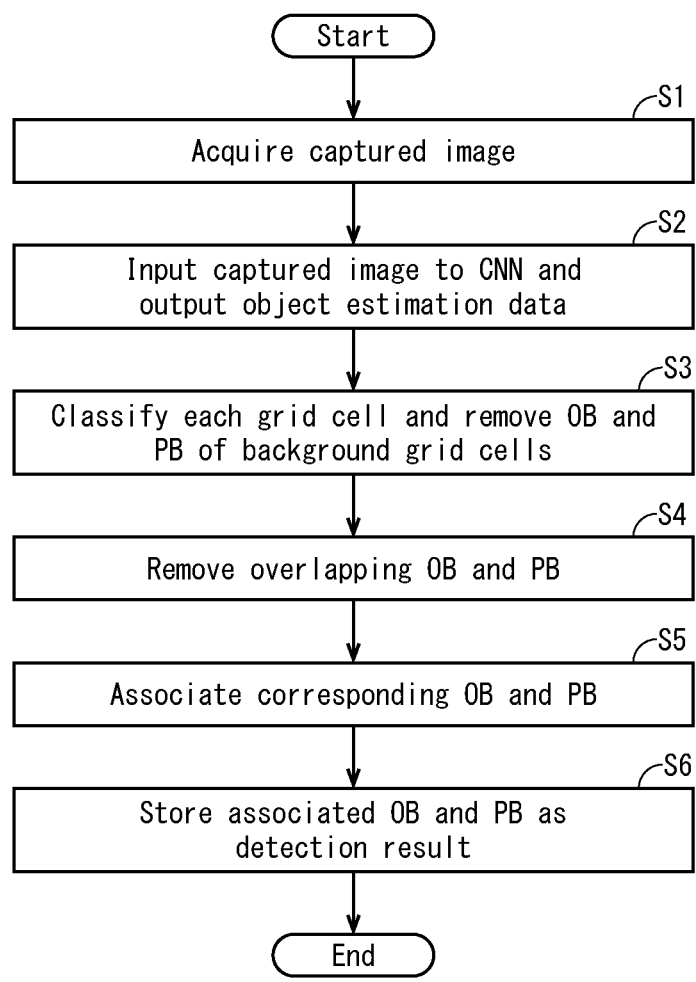
FIG. 2 is a flow chart illustrating operation of object detection device 100.

FIG. 2 is a flow chart illustrating operation of the object detection device 100.

The camera 200 acquires a captured image (step S1), inputs the captured image to the CNN 130, and the CNN 130 outputs W×H×(5×(1+2N)+C) dimensional object estimation data (step S2).

The object detection unit 140 classifies grid cells, removes OBs and PBs of background grid cells (step S3), and removes BBs (OBs and PBs) having a high degree of overlap with BBs (OBs and PBs) of grid cells that have higher confidence scores (step S4).

The association unit 40 associates remaining OBs with PBs (step S5), and stores associated OBs and PBs as the object detection result 121 (step S6).

2. Supplement

Although the present invention has been described above based on embodiments, the present invention is of course not limited to the embodiments described above, and the following modifications are of course included in the technical scope of the present invention.

(1) According to an embodiment described above, in an object model that is a three-dimensional model of an object, a point that protrudes or is recessed from other portions is defined as a key point. However, the object model does not have to be three-dimensional, and may be a two-dimensional object model.

(2) According to an embodiment described above, the control unit 110 is a computer system composed of CPU, ROM, RAM, etc., but part or all of each processing unit may be a system large scale integration (LSI).

(3) The above embodiments and modifications may be combined.

INDUSTRIAL APPLICABILITY

The present disclosure is useful as an object detection device mounted on a surveillance camera system or an in-vehicle camera system.

REFERENCE SIGNS

1 Object detection device
120 Storage unit
130 CNN
140 Object detection unit
150 AI training unit
200 Camera

The invention claimed is:

1. An object detection method for detecting each object in an image containing one or more objects of one or more defined categories, comprising:
a key point estimation step of estimating key point candidates for each object in the image; and
a detection step of detecting key points for each object based on the estimated key point candidates, wherein
considering an object model that models shape of an object, the key points are points that satisfy a defined condition among points indicating a boundary of the object model that are projected onto defined coordinate axes,
the defined coordinate axes have an origin at a geometric center of the object model and each forms a defined angle relative to a polar axis in a polar coordinate system set for the object model, and
two key points of the key points are defined for each of the coordinate axes, the two key points for each of the coordinate axes are a point on the boundary of the object having a maximum value and a point on the boundary of the object having a minimum value in a positive range of the each of the coordinate axes.

2. The object detection method of claim 1, wherein the key points are selected as points on the object having a local maximum or local minimum value, and the two key points for each of the coordinate axes are determined from the points on the object having a local maximum or local minimum value.

3. The object detection method of claim 1, further comprising
a center position estimation step of estimating a center candidate for each object in the image and a confidence indicating likelihood of accurate estimation, wherein
the detection step uses the confidence to detect a center position of each object from the center candidates, and uses each detected center position in detection of the key points of each object from the key point candidates.

4. The object detection method of claim 3, wherein the key point estimation step and the center position estimation step are executed by a machine-learning model trained to detect each object.

5. The object detection method of claim 1, wherein the key point estimation step estimates the key point candidates as areas each having a size based on a corresponding object of the one or more objects.

6. The object detection method of claim 1, wherein the key point estimation step is executed by a machine-learning model trained to detect each object.

7. The object detection method of claim 6, wherein the machine-learning model is a convolutional neural network, and
parameters of the convolutional neural network are defined by machine-learning based on a training image including a detection target object, a true value of a center position of the detection target object in the training image, and a true value of a key point of the detection target object in the training image.

8. The object detection method of claim 1, wherein each of the key points that satisfies the defined condition is a point on the surface of the object model that is a point of a local maximum coordinate value or a local minimum coordinate value among points on the surface of the object model such that the each key point protrudes from other portions of the object or is recessed from other portions of the object.

9. The object detection method of claim 8, further comprising
a center position estimation step of estimating a center candidate for each object in the image and a confidence indicating likelihood of accurate estimation, wherein
the detection step uses the confidence to detect a center position of each object from the center candidates, and uses each detected center position in detection of the key points of each object from the key point candidates.

10. The object detection method of claim 9, wherein the key point estimation step and the center position estimation step are executed by a machine-learning model trained to detect each object.

11. The object detection method of claim 8, wherein the key point estimation step estimates the key point candidates as areas each having a size based on a corresponding object of the one or more objects.

12. The object detection method of claim 8, wherein the key point estimation step is executed by a machine-learning model trained to detect each object.

13. The object detection method of claim 12, wherein the machine-learning model is a convolutional neural network, and
parameters of the convolutional neural network are defined by machine-learning based on a training image including a detection target object, a true value of a center position of the detection target object in the training image, and a true value of a key point of the detection target object in the training image.

14. An object detection device for detecting each object in an image containing one or more objects of one or more defined categories, comprising:
a machine-learning model trained to detect each object, which executes a key point estimation process of estimating key point candidates for each object in the image; and
a detection unit that detects key points for each object based on the estimated key point candidates, wherein
considering an object model that models shape of an object, the key points are points that satisfy a defined condition among points indicative of a boundary of the object model that are projected onto a defined coordinate axis, and the defined coordinate axes have an origin at a geometric center of the object model and each forms a defined angle relative to a polar axis in a polar coordinate system set for the object model, and two key points of the key points are defined for each of the coordinate axes, the two key points for each of the coordinate axes are a point on the boundary of the object having a maximum value and a point on the boundary of the object having a minimum value in a positive range of the each of the coordinate axes.

15. A non-transitory computer readable medium storing a program causing a computer to execute object detection processing for detecting each object in an image containing one or more objects of one or more defined categories, wherein the object detection processing comprises:

a key point estimation step of estimating key point candidates for each object in the image; and a detection step of detecting key points for each object based on the estimated key point candidates, wherein considering an object model that models shape of an object, the key points are points that satisfy a defined condition among points indicative of a boundary of the object model that are projected onto a defined coordinate axis, and the defined coordinate axes have an origin at a geometric center of the object model and each forms a defined angle relative to a polar axis in a polar coordinate system set for the object model, and two key points of the key points are defined for each of the coordinate axes, the two key points for each of the coordinate axes are a point on the boundary of the object having a maximum value and a point on the boundary of the object having a minimum value in a positive range of the each of the coordinate axes.

* * * * *